United States Patent
Kuehn et al.

(10) Patent No.: US 9,583,772 B2
(45) Date of Patent: Feb. 28, 2017

(54) OXIDE-CERAMIC HIGH-TEMPERATURE FUEL CELL

(75) Inventors: Sascha Kuehn, Dresden (DE); Katrin Klein, Dresden (DE); Gerhard Buchinger, Wels (AT)

(73) Assignee: EZELLERON GMBH, Dresden (DE)

( * ) Notice: Subject to any disclaimer, the term of this patent is extended or adjusted under 35 U.S.C. 154(b) by 243 days.

(21) Appl. No.: 13/322,581

(22) PCT Filed: May 28, 2010

(86) PCT No.: PCT/EP2010/003276
§ 371 (c)(1),
(2), (4) Date: Feb. 13, 2012

(87) PCT Pub. No.: WO2010/136214
PCT Pub. Date: Dec. 2, 2010

(65) Prior Publication Data
US 2012/0148940 A1    Jun. 14, 2012

(30) Foreign Application Priority Data

May 28, 2009   (DE) .................. 10 2009 023 798

(51) Int. Cl.
*H01M 8/12* (2016.01)
*H01M 8/02* (2016.01)
*H01M 8/24* (2016.01)

(52) U.S. Cl.
CPC ....... *H01M 8/0265* (2013.01); *H01M 8/1206* (2013.01); *H01M 8/1213* (2013.01); *H01M 8/1226* (2013.01); *H01M 8/1231* (2016.02); *H01M 8/1286* (2013.01); *H01M 8/243* (2013.01); *Y02E 60/521* (2013.01); *Y02E 60/525* (2013.01)

(58) Field of Classification Search
CPC ............. H01M 8/1206; H01M 8/1213; H01M 8/1226; H01M 8/1286; H01M 8/0265; H01M 8/243; Y02E 60/525
USPC .......................................... 429/508
See application file for complete search history.

(56) References Cited

U.S. PATENT DOCUMENTS

| 2004/0023101 | A1  | 2/2004 | Jacobson et al. |
| 2004/0096718 | A1* | 5/2004 | Gomez ........................ 429/30 |
| 2005/0008916 | A1* | 1/2005 | Okamoto ............ H01M 8/0247 429/441 |
| 2006/0093891 | A1  | 5/2006 | Issacci et al. |

(Continued)

FOREIGN PATENT DOCUMENTS

| CN | 1491446 A | 4/2004 |
| EP | 0442742 A1 | 8/1991 |

(Continued)

*Primary Examiner* — Jonathan Jelsma
(74) *Attorney, Agent, or Firm* — Jacobson Holman, PLLC.

(57) ABSTRACT

The present invention relates to high-temperature solid oxide fuel cells, in particular to rotationally symmetrical high-temperature solid oxide fuel cells. The inventive oxide-ceramic high-temperature fuel cell having one or more gas channel(s) open at at least one end. The fuel cell has a substrate surrounding the gas channel(s) at least sectionally, preferably completely. The gas channel(s) and/or the substrate surrounding the gas channel(s) has/have (a) changing cross-sections(s), preferably (a) conically tapering cross-section(s), seen in the direction of the longitudinal axis/axes of the gas channel(s).

11 Claims, 14 Drawing Sheets

(56) References Cited

U.S. PATENT DOCUMENTS

| | | |
|---|---|---|
| 2006/0204826 A1 | 9/2006 | Borchers |
| 2008/0118812 A1* | 5/2008 | Kawakami et al. ............ 429/38 |
| 2009/0155660 A1* | 6/2009 | Yu et al. ......................... 429/31 |

FOREIGN PATENT DOCUMENTS

| | | |
|---|---|---|
| EP | 0442743 A1 | 8/1991 |
| EP | 1176656 A2 | 1/2002 |
| EP | 1653543 A2 | 5/2006 |
| EP | 2023431 A1 | 2/2009 |
| JP | 03238760 A | 10/1991 |
| JP | 6-243879 A | 2/1993 |
| JP | 06243879 A | 9/1994 |
| JP | 2000182635 A | 6/2000 |
| WO | WO 96/04690 | 2/1996 |
| WO | WO 2009/010840 A2 | 1/2009 |

* cited by examiner

OXIDE-CERAMIC HIGH-TEMPERATURE FUEL CELL

This is a national stage of PCT/EP10/003276 filed May 28, 2010 and published in English, which claims the priority of German number 10 2009 023 798.4 filed May 28, 2009, hereby incorporated by reference.

The present invention relates to high-temperature solid oxide fuel cells, in particular to rotationally symmetrical high-temperature solid oxide fuel cells.

Concepts already exist for high-temperature solid oxide fuel cells which are documented in the technical literature (Fuel Cell Handbook 7th edition, EG&G Services, Inc. U.S. Department of Energy, Office of Fossil Energy, National Energy Technology Laboratory, Morgantown, West Virginia, November 2004; Handbook of Fuel Cells Fundamentals, Technology and Application, Wolf Vielstich, Hubert A. Gasteiger, Arnold Lamm, 2003 John Wiley & Sons, Ltd.); they include tubular, planar and monolithic architectures of the cells. A special case of tubular architecture is the so-called microtubular architecture; it is characterized by extreme stability towards high temperature gradients and, associated therewith, a fast cycling capability. Furthermore, it has an improved volumetric power density due to its higher surface-to-volume ratio (High Temperature Solid Oxide Fuel Cells: Fundamentals, Design and Applications; S. C. Singhal et al.; ISBN 1856173879; Elsevier Ltd., 2003, Oxford).

It is the object of this invention, starting from the known cell concepts, to improve them with respect to the electrical contacts, the mechanical stability and the gas diffusion and to improve the integration capability of the fuel cells into a reactor.

This object is achieved by a fuel cell system in accordance with claim 1. Further advantageous embodiments of a fuel cell system in accordance with the invention can be seen from the dependent claims.

The individual features of the embodiments described in the following can in this respect also be realized independently of one another within the framework of the present invention, that is, they do not have to be implemented in exactly the feature combinations shown in the examples.

It is the fundamental idea of the present invention to design the gas channel(s) and/or the substrate surrounding it/them via the length of the gas channel(s) of the cell such that it/they has/have (a) changing cross-section(s): Contrary to an unchanging cross-section, this makes possible an improvement of the electrical connections, of the gas diffusion and of the mechanical stability and a reduction of losses as well as an improvement in the installation possibilities in a later stack, with a stack designating the electrical and gas-side combination of individual fuel cells to form a reactor unit.

An oxide-ceramic high-temperature fuel cell in accordance with the invention therefore has: one or more gas channel(s) open at at least one end, a substrate surrounding the gas channel(s) at least sectionally, preferably completely, with the gas channel(s) and/or the substrate surrounding the gas channel(s) having (a) changing cross-section(s), preferably (a) conically tapering cross-section(s), viewed in the direction of the longitudinal axis/axes of the gas channel(s).

Fuel cells in accordance with the invention are thus characterized by an improved geometry in the form of a cross-section varying over the length of the fuel cell. In particular rotationally symmetrical high-temperature solid oxide fuel cells in accordance with the invention having a cross-section varying over the length of the fuel cell substrate improve the gas diffusion, the electrical conduction and the mechanical strength of the cells.

Furthermore, advantageous variants of the fuel cells in accordance with the invention having improved geometry which will be described in detail make it possible to facilitate the integration of the high temperature solid oxide fuel cells into a stack system in that they inter alia facilitate the sealing of the cells.

Possible design features with which this simplified installation can be realized can be threads, prolongations or recesses, as described in the following.

Applied internal threads or external threads allow shape-matched connections in accordance with the invention and thus simplify the sealing of the connections between the cell and the stack and additionally minimize the losses at the transition from cell to stack when the thread comprises electrically conductive material.

Prolongations which are suitable to apply clamped connections and/or plug-in connections to the stack can also serve an improved integration capability in accordance with the invention since clamped connections are also characterized by transitions with an exact fit.

A further possibility in accordance with the invention is represented by prolongations which are suitable to simplify adhesive connections, solder connections and/or weld connections to the stack, which can e.g. be realized by corresponding ends expanding the substrate and having rings let in for the reception of adhesives or e.g. Ag rings which run into a sealing and contacting solder on melting.

Recesses in accordance with the invention into which sealing materials such as Ag rings can advantageously be introduced with an exact fit facilitate the sealing of the connections between the cell and the stack since these rings can optionally be held in place on the soldering of the cells into the stack and the seal can thereby be realized without faults at the defined position.

A further construction feature in accordance with the invention which improves the seal and the contact between the cell and the stack is represented by prolongations which are suitable to be integrated into a corresponding counter-shape of the stack.

If the design features in accordance with the invention, that is e.g. the prolongations, threads and/or recesses, are electrically conductive, the electrical contacting is additionally improved by an enlarging of the contact surface between the cell and the current discharging unit of the stack (e.g. contact plate) and the transition resistance is thus lowered.

The production of the substrate having the design features from the same material is advantageous to avoid inter alia join positions and the problems which arise there such as non-sealing, peeling off, etc. The substrate and optionally the design elements can be made from metals, ceramics and/or mixtures of metal and ceramic (e.g. cermets). They can, on the one hand, be materials suitable as anode material such as a cermet made from a metal, advantageously nickel, and at least one conically and/or electronically conductive ceramic material. Doped zirconium oxides (e.g. doped with yttrium and/or samarium and/or scandium) and/or doped ceroxides (e.g. doped with gadolinium and/or scandium) are named as examples for the ceramic material here; further metals, in particular copper, cobalt and/or other transition metals and/or metal alloys can also be contained.

On the other hand, the material can also be suitable as a cathode. In this case, the following compounds can inter alia be used: Ferrates such as LSCF (lanthanum strontium cobalt ferrate); manganates such as LSM (lanthanum strontium manganate) and LCM (lanthanum calcium manganate), nickelates and/or cobaltates (e.g. LSC). Compounds from the group of perovskites are particularly preferred. Metals, in particular high-temperature alloys such as Crofer 22 APU (X1CrTiLa22) can be considered as the material for the substrate as an electrically conductive carrier and thus also for the design features.

Preferred embodiments of the invention are set forth in the claims. One such embodiment includes gas channels which have a gas-tight coating to ensure a compulsory flow of the incoming gas up to the end of the substrate and a subsequent discharge of the gas/exhaust gas through the total substrate. The gas-tight coating is located at the side walls of the gas channel. It is preferably a ceramic layer. It is preferably made from the electrolyte material. The gas channel is arranged here as in the other embodiments (see in the following); the difference only comprises the fact that the substrate is closed at one end. The porosity for the gas permeability amounts to between 10 and 90%, preferably 25 to 50%; the preferred pore diameter is between 0.5 and 100 μm.

Further important features and advantages of the invention result from the dependent claims, from the drawings and from the associated Figure description with reference to the drawings.

It is understood that the aforesaid features and the features still to be explained in the following cannot only be used in the respectively given combination, but also in other combinations or alone without leaving the framework of the present invention.

Preferred embodiments of the invention are shown in FIGS. 1 to 15 described in the following and will now be explained in more detail.

EXAMPLE 1

FIG. 1 shows a schematic drawing of a high-temperature fuel cell with a tubular substrate (1) (which is here made as anode of the cell, but can also represent the cathode) which envelopes a conical gas channel (2) in cross-section through the longitudinal axis of the channel (dashed line). The gas channel tapers from one end to the other end of the cell at an angle of 1° so that the gas channel diameter at the one end is 1000 μm here and is 500 μm at the other end.

This conical tapering results in improved gas diffusion and in a reduction of the ohmic losses at the thicker side of the electrode.

EXAMPLE 2

FIG. 2 shows a corresponding cross-section of a further high-temperature fuel cell in accordance with the invention, but here with a conically tapering substrate (1) (the tapering angle here corresponds to 5°) and with a tubular gas channel (2) which is made cylindrical here, that is, not tapering. The triple phase boundary (TPB) is enlarged and thus cell performance improved by this design.

EXAMPLE 3

FIG. 3 shows a corresponding cross-section of a tubular high-temperature fuel cell corresponding to Example 2, but here with a conical substrate (1) which serves as an inner electrode, with a gas channel (2) and additionally with an outer electrode (4) having an internal cone adapted to the inner electrode and the electrolyte (3). The outer periphery of the fuel cell shown therefore corresponds to a cylinder. A considerable enlarging of the three phase boundary (TPB) and thus an improvement of the cell performance is achieved by means of this construction.

EXAMPLE 4

FIG. 4 shows a corresponding cross-section of a high-temperature fuel cell open at both sides and having a diameter reducing abruptly at two steps from one end to the other along the longitudinal gas channel axis (dashed line). The substrate is here made as an inner electrode which is coated with the electrolyte (3). The adapted counter electrode (4), which ensures a cylindrical outer shape, is located on the electrolyte at the (outwardly disposed) side remote from the inner electrode. The gas channel (2) in the substrate (1) is here made in cylinder shape, that is, not tapering. Additionally, further gas channels (5) are introduced into the counter-electrode (4) along the longitudinal axis of the cell or the longitudinal axis of the gas channel (2). The possibilities for the electrical connection and the possibilities for the sealing on the installation are improved by the step-wise thickening of the counter-electrode (4) and the projection of the inner electrode over the counter-electrode.

FIGS. 5 and 6 show modifications of the high-temperature fuel cell shown in FIG. 4 having a thinner counter-electrode (4) and additional electrode contacts (6) for one or both electrodes (1, 4).

The counter-electrode is made as a thin layer (100 nm-1 mm). The electrode contacts comprise the rings disposed around the electrode and wires led away therefrom.

FIG. 7 shows a modification of the high-temperature fuel cell shown in FIG. 1 with a conical gas channel (2) in the substrate (1) and a thread (7) at that end of the cell toward which the gas channel widens. This improves the integration into a stack and facilitates the gas seal. In addition, the electrical contact is improved.

The thread is disposed in each case at the end and/or at the start of the substrate and surrounds a part of the gas channel and is made so that it fits into a corresponding counter-piece of the stack or of a connection piece.

Figure 1:
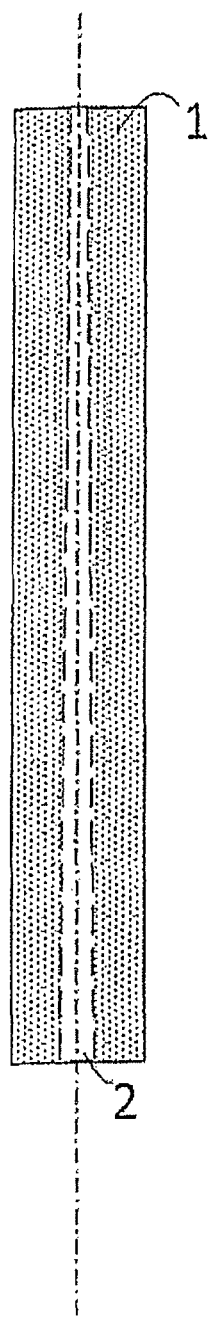
Figure 2:
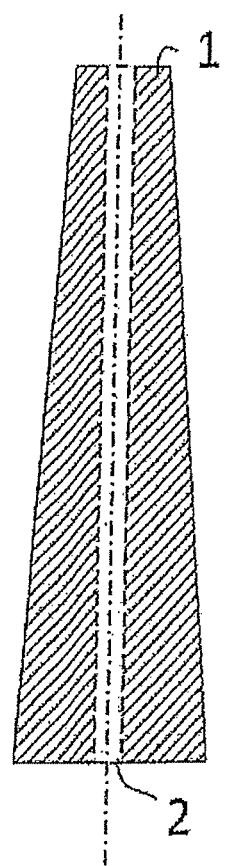
Figure 3:
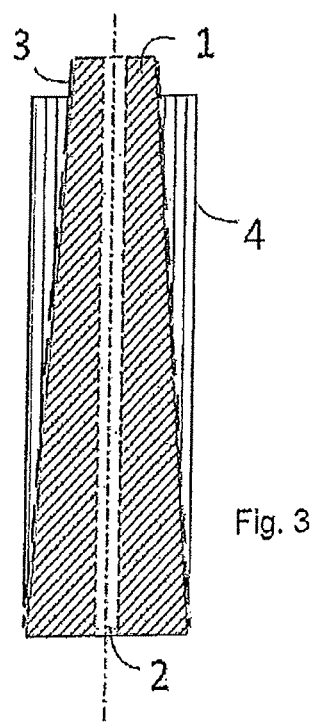
Figure 4:
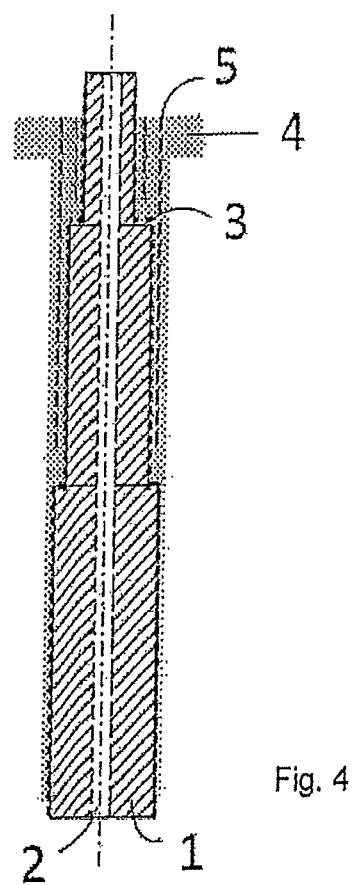
Figure 5:
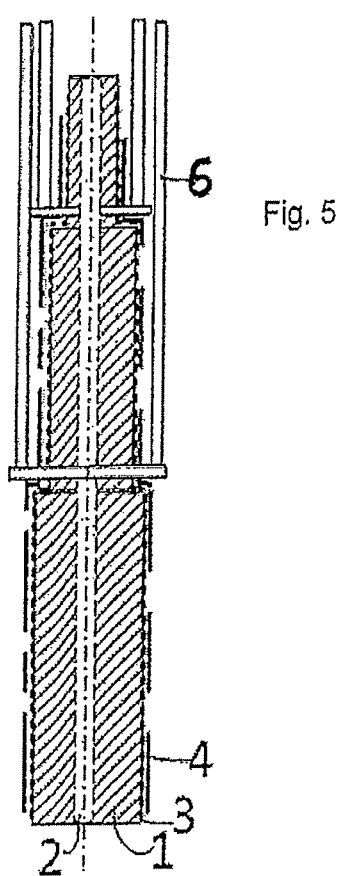
Figure 6:
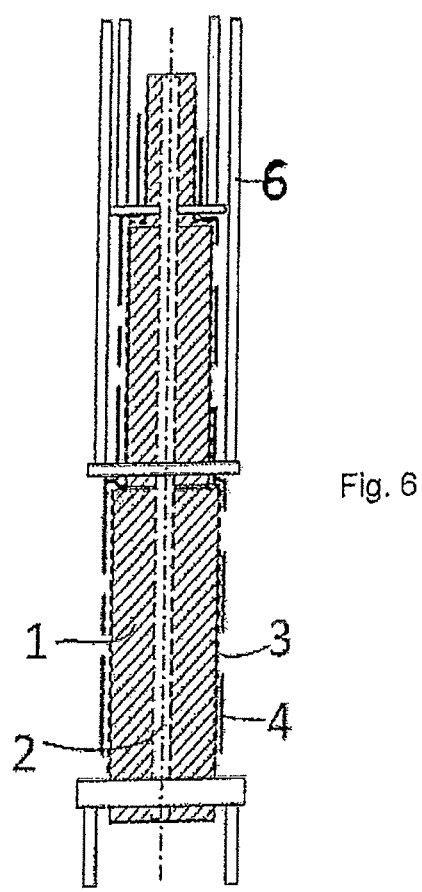
Figure 7:
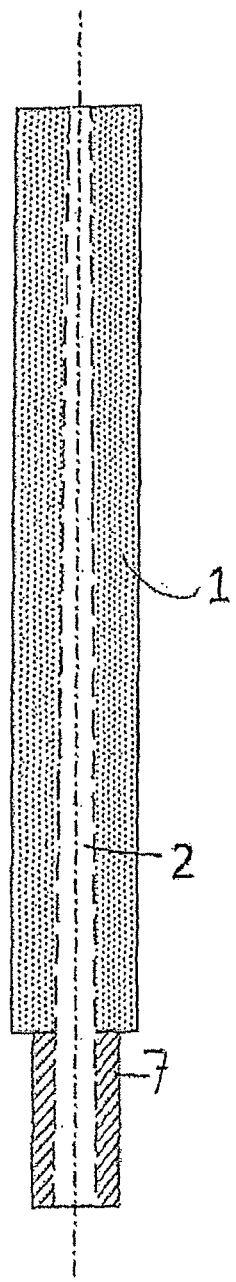
Figure 8:
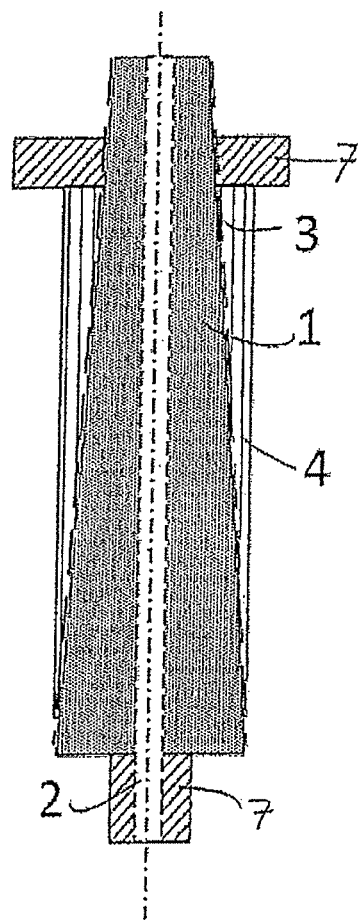
FIGS. 8 and 9 show a modification of the high-temperature fuel cell shown in FIG. 3 of a conical substance (1) having a gas channel (2), an electrolyte (3) and an adapted outer electrode (4). A thread (7) for both electrodes is additionally in each case present at both cell ends.
Figure 9:
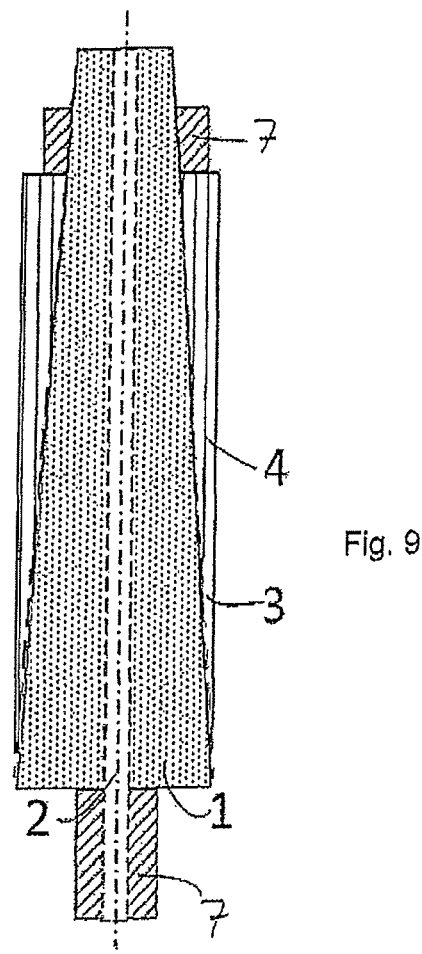
Figures 10, 11:
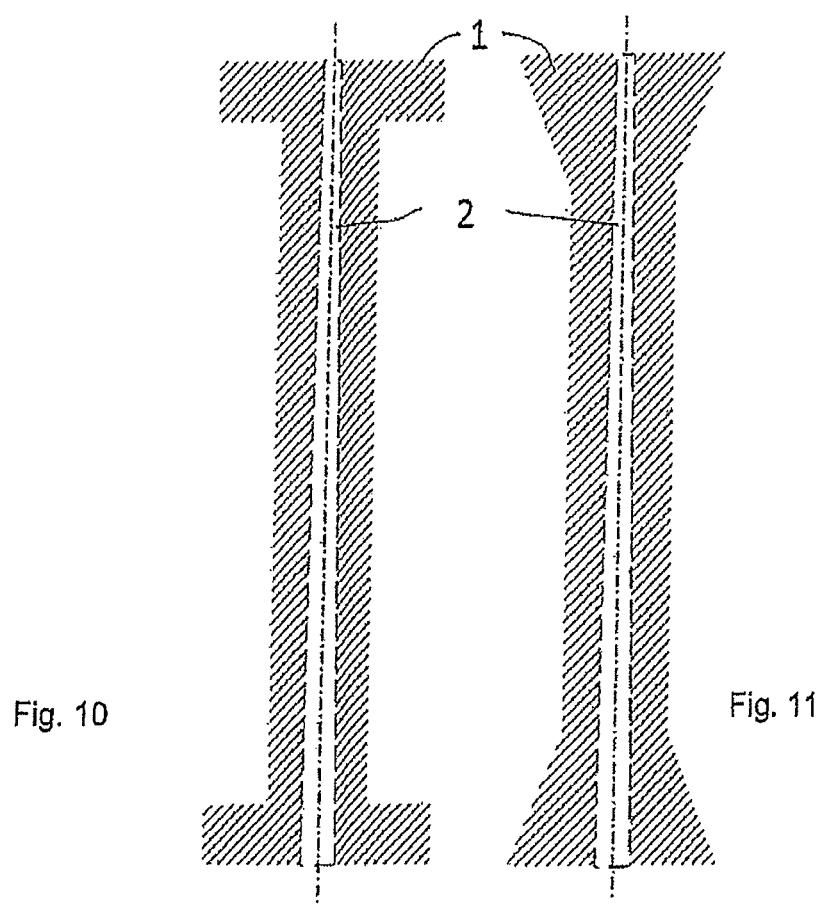
FIGS. 10 and 11 show further advantageous embodiments of the substrate or of the bearing structure (1) in cross-section for a better integrating capability into a stack system. The substrate can here be the bearing structure, the electrolyte or the electrode.
Figure 12:
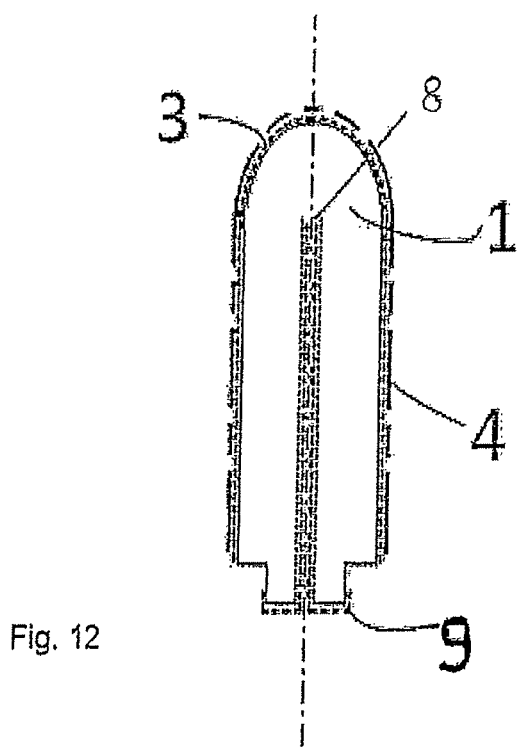

FIG. 12 shows in a cross-section a tubular high-temperature fuel cell having a closed end. The gas infeed takes place here via a hole (8) in the substrate (1) through which the gas flows and which is provided with a leak-proof layer (9) on the inner side. The integration into a stack and the gas seal is improved by the specific design.

Figure 13:
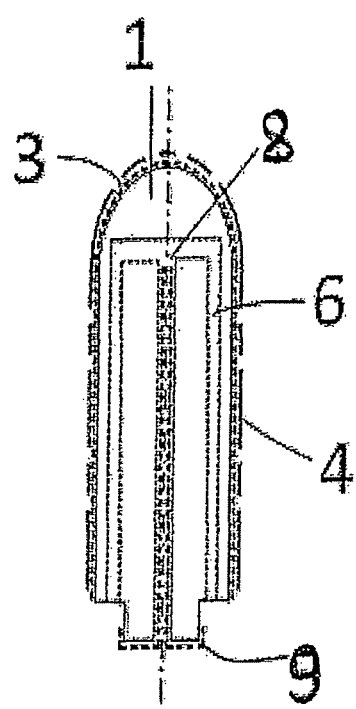

FIG. 13 shows in a cross-section a tubular high-temperature fuel cell having a closed end as in FIG. 12; additional highly porous gas channels (5) are provided to ensure the backflow of the gas.

Figure 14:
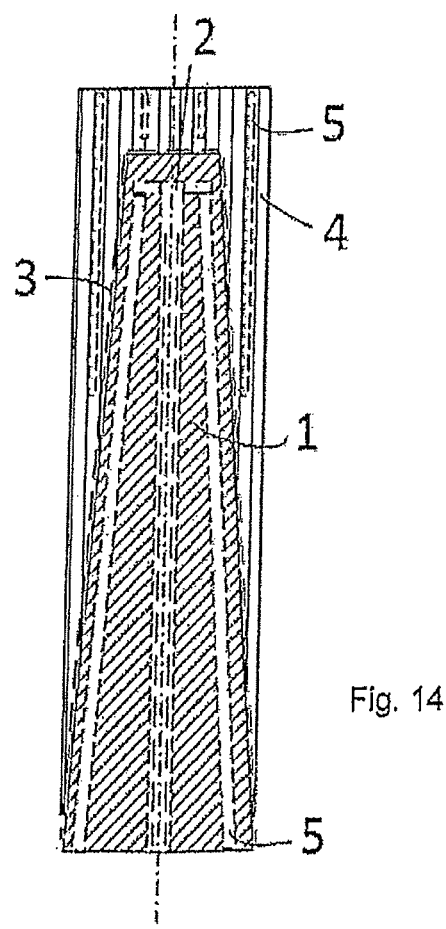

FIG. 14 shows in cross-section an SOFC with a conical substrate (1) closed at one end, an electrolyte (3) and a geometrically adapted counter-electrode (4) as well as a hole (8) for the gas infeed, which is otherwise coated in a leak-tight manner at the inside, and additional gas channels (5) for both electrodes.

Figure 15:
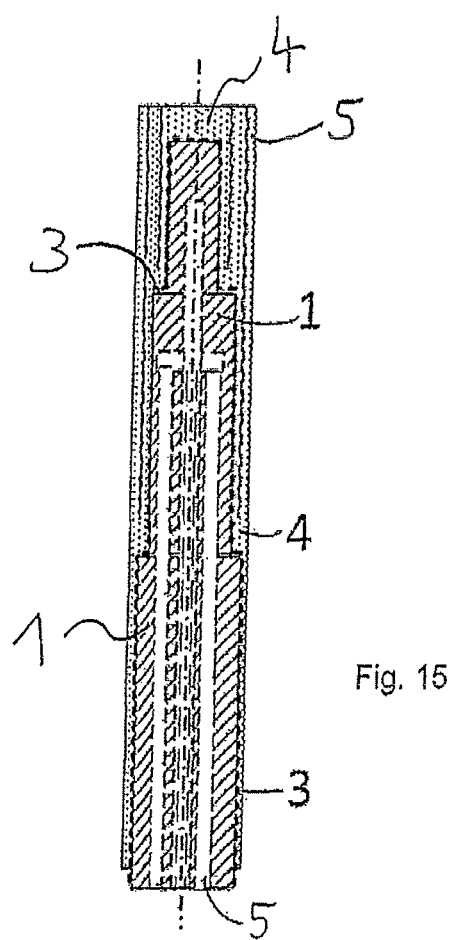

FIG. 15 shows in cross-section an SOFC closed at one side having a step-wise reduction of the substrate diameter, a gas inlet (10) coated in a leak-proof manner, an electrolyte (3) and a geometrically adapted counter-electrode (4) as well as additional gas channels (5).

The essential feature here is the substrate closed at one side, in conjunction with the inner gas channel with a leak-proof coating and the hole in this inner layer at the end to ensure the gas inlet into the substrate.

The invention claimed is:

1. An oxide-ceramic high-temperature tubular fuel cell having a rotationally symmetrical gas channel (2) open at least at one end, characterized in that the fuel cell has a substrate (1) surrounding the gas channel rotationally symmetrical at least sectionally along its periphery,
    wherein the substrate forms an electrical discharge structure which is not part of the anode and is not part of the cathode of the fuel cell, or forms a bearing structure of the fuel cell which is not part of the anode and is not part of the cathode of the fuel cell and which is not part of an electrolyte of the fuel cell, wherein said substrate has rotationally symmetrical conically tapering cross-sections that change continuously along the longitudinal axis of the gas channel and
    wherein the substrate (1) forms the anode of the fuel cell or the substrate (1) forms the cathode of the fuel cell; and wherein
    the substrate (1) serves as an inner electrode, and
    said fuel cell further having an outer electrode, said outer electrode having an internal cone adapted to the inner electrode and the electrolyte, so the outer periphery of the fuel cell corresponds to a cylinder; and wherein
    said fuel cell includes a connecting structure located at an end of said fuel cell for connecting said fuel cell with a fuel cell stack, said connecting structure comprising one or more internal or external threads, recesses, or prolongations integrated into or formed from said substrate and having a shape matched to provide an exact fit with a counter-shape within a fuel cell stack to which the fuel cell is connectable,
    said threads, recesses, or prolongations connected to a fuel cell stack by clamping, plug-in, inserting, adhering, soldering, or welding,
    said threads, recesses, or prolongations made as part of said anode, cathode, electrical discharge structure, or bearing structure section of the fuel cell,
    and wherein said threads, recesses, or prolongations are electrically conductive to enlarge the electrical contact surface between the fuel cell and a current-discharge unit of the fuel cell stack.

2. A fuel cell in accordance with claim 1, wherein the electrical discharge structure or the bearing structure has a wall thickness in the range of 100 μm to 3000 μm.

3. A fuel cell in accordance with claim 2, wherein the wall thickness is in the range of 100 μm to 1000 μm.

4. A fuel cell in accordance with claim 1, characterized by at least one conical gas channel.

5. A fuel cell in accordance with claim 1, characterized in that the material of the substrate is suitable as an anode material or as a current conductor for solid oxide fuel cells at the anode side;
    or contains or is made of a metal, a metal alloy, a ceramic material or a mixture of at least one metal or of one metal alloy and at least one ceramic material.

6. A fuel cell in accordance with claim 5, characterized in that at least one of the metals is a metal of the transition elements, or the ceramic material contains or is made of an ionically or electronically conductive material having a fluorite structure or perovskite structure, or an electrically conductive carrier of the fuel cell contains or is made of a steel or a super alloy, based on Mn, W, Co, Al, Ni, Fe, Cr, Mo, Re, Ti, Zr, Ru, Ta, Nb, B or C.

7. A fuel cell in accordance with claim 1, characterized in that the material of the substrate contains or is made of a cathode material or as a current conductor for solid oxide fuel cells at the cathode side or a ceramic material or a metal.

8. A fuel cell in accordance with claim 7, characterized in that the metal is a metal or an alloy stable with respect to oxidation under the operating and manufacturing conditions of the fuel cell; and wherein the metal includes a precious metal or a high-temperature alloy, and wherein the ceramic material contains or is made of at least one ionically or electronically conductive compound selected from the compound class of the perovskites or of the group of doped ferrates or of doped manganates or of doped cobaltates or of doped chromates or of doped nickelates; and wherein the ceramic includes a combination of one of the aforesaid compounds with a doped zirconium oxide or doped cerium oxide or doped bismuth oxide or doped gallate.

9. A fuel cell in accordance with claim 1, characterized in that the material of the substrate is suitable as an electrically conductive carrier material and includes a high-temperature alloy.

10. An oxide-ceramic high-temperature tubular fuel cell having a rotationally symmetrical gas channel (2) open at least at one end, characterized in that the fuel cell has a substrate (1) surrounding the gas channel rotationally symmetrical at least sectionally along its periphery,
    wherein the substrate forms an electrical discharge structure which is not part of the anode and is not part of the cathode of the fuel cell, or forms a bearing structure of the fuel cell which is not part of the anode and is not part of the cathode of the fuel cell and which is not part of an electrolyte of the fuel cell, wherein said substrate has rotationally symmetrical conically tapering cross-sections that change continuously along the longitudinal axis of the gas channel and
    wherein the substrate (1) forms the anode of the fuel cell or the substrate (1) forms the cathode of the fuel cell; and wherein
    the substrate (1) serves as an inner electrode, and
    said fuel cell further having an outer electrode, said outer electrode having an internal cone adapted to the inner electrode and the electrolyte, so the outer periphery of the fuel cell corresponds to a cylinder; and wherein
    said fuel cell includes a connecting structure located at an end of said fuel cell for connecting said fuel cell with a fuel cell stack,
    said connecting structure comprising one or more internal or external threads integrated into or formed from said substrate and having a shape matched to provide an exact fit with a counter-shape within a fuel cell stack to which the fuel cell is connectable,
    said threads made as part of said anode, cathode, electrical discharge structure, or bearing structure section of the fuel cell.

11. An oxide-ceramic high-temperature tubular fuel cell having a rotationally symmetrical gas channel (2) open at least at one end, characterized in that the fuel cell has a substrate (1) surrounding the gas channel rotationally symmetrical at least sectionally along its periphery,
    wherein the substrate forms an electrical discharge structure which is not part of the anode and is not part of the cathode of the fuel cell, or forms a bearing structure of the fuel cell which is not part of the anode and is not part of the cathode of the fuel cell and which is not part of an electrolyte of the fuel cell, wherein said substrate has rotationally symmetrical conically tapering cross-sections that change continuously the longitudinal axis of the gas channel and wherein the substrate (1) forms the anode of the fuel cell or the substrate (1) forms the cathode of the fuel cell; and wherein the substrate (1) serves as an inner electrode, and said fuel cell further having an outer electrode, said outer electrode having an internal cone adapted to the inner electrode and the electrolyte, so the outer periphery of the fuel cell corresponds to a cylinder; and wherein said fuel cell includes a connecting structure located at an end of said fuel cell for connecting said fuel cell with a fuel cell stack, said connecting structure comprising one or more recesses with a sealing material therein, said recesses integrated into or formed from said substrate, said recesses with a sealing material therein having a shape matched to provide an exact fit with a counter-shape within a fuel cell stack to which the fuel cell is connectable, said recesses made as part of said anode, cathode, electrical discharge structure, or bearing structure section of the fuel cell, and wherein said fuel cell is connectable to a fuel cell stack by clamping, plug-in, inserting, adhering, soldering, or welding.

\* \* \* \* \*